United States Patent [19]

Sacripante et al.

[11] Patent Number: 5,290,654
[45] Date of Patent: Mar. 1, 1994

[54] MICROSUSPENSION PROCESSES FOR TONER COMPOSITIONS

[75] Inventors: Guerino G. Sacripante, Oakville; James M. Duff, Mississauga; Grazyna Kmiecik-Lawrynowica, Burlington; Raj D. Patel, Oakville, all of Canada

[73] Assignee: Xerox Corporation, Stamford, Conn.

[21] Appl. No.: 921,165

[22] Filed: Jul. 29, 1992

[51] Int. Cl.$^5$ .............................................. G03G 9/087
[52] U.S. Cl. ....................................... 430/137; 430/111; 523/322; 523/335; 523/339
[58] Field of Search ............... 430/137, 111; 523/322, 523/335, 339

[56] References Cited

U.S. PATENT DOCUMENTS

| | | | |
|---|---|---|---|
| 4,401,806 | 8/1983 | Hagiwara et al. | 523/335 |
| 4,558,108 | 12/1985 | Alexandru et al. | 526/340 |
| 4,668,768 | 5/1987 | Mendiratta et al. | 528/493 |
| 4,797,339 | 1/1989 | Maruyama et al. | 430/109 |
| 4,983,488 | 1/1991 | Tan et al. | 430/137 |
| 4,996,127 | 2/1991 | Hasegawa et al. | 430/109 |
| 5,164,282 | 11/1992 | Mahabadi | 430/137 |

FOREIGN PATENT DOCUMENTS

| | | | |
|---|---|---|---|
| 61-091666 | 5/1986 | Japan | 430/137 |
| 903061 | 8/1982 | United Kingdom . | |

*Primary Examiner*—Christopher Rodee
*Attorney, Agent, or Firm*—E. O. Palazzo

[57] ABSTRACT

A process for the preparation of toner compositions which comprises dissolving a polymer, and optionally a pigment in an organic solvent; dispersing the resulting solution in an aqueous media containing a surfactant, or mixture of surfactants; stirring the mixture with optional heating to remove the organic solvent thereby obtaining suspended particles of about 0.05 micron to about 2 microns in volume diameter; subsequently homogenizing the resulting suspension with an optional pigment in water and surfactant; followed by aggregating the mixture by heating thereby providing toner particles with an average particle volume diameter of from between about 3 to about 21 microns when said pigment is present.

19 Claims, No Drawings

MICROSUSPENSION PROCESSES FOR TONER COMPOSITIONS

BACKGROUND OF THE INVENTION

The present invention is generally directed to toner processes, and more specifically to microsuspension processes for the preparation of toner compositions. In embodiments the present invention is directed to the economical preparation of toners without the utilization of the known pulverization and/or classification methods, and wherein toners with an average volume diameter of from about 3 to about 21 microns can be obtained. The resulting toners can be selected for known electrophotographic imaging and printing processes, including color processes, and lithography. In embodiments, the present invention is directed to a process comprised of homogenizing microsuspended particles of from about 0.05 micron to about 2 microns in volume diameter, containing a resin and pigment in an aqueous solution containing surfactant, followed by aggregating the aforementioned pigmented particles by heating to generate toners with an average particle volume diameter of from about 3 to about 21 microns. In another embodiment thereof, the present invention is directed to an in situ process comprised of dissolving a polymer resin such as a polyester, polyacrylate, styrene butadiene, or polymethacrylate of from about 5 to about 80 weight percent, and a pigment such as HELIOGEN BLUE TM or HOSTAPERM PINK TM of from about 1 to about 10 weight percent in an organic solvent such as methylene chloride or ethyl acetate; dispersing the resulting mixture in an aqueous solution containing surfactants such as sodium dodecylsulfate and polyoxyethylene nonyl phenyl ether, thereby obtaining suspended particles of from about 0.05 micron to about 2 microns in volume diameter; removing the organic solvent by stirring and optionally by heating from about 25° C. to about 60° C.; homogenizing the mixture at about 500 to about 4,000 revolution per minute; and followed by aggregating the aforementioned pigmented particles by heating to generate toners with an average particle diameter of from about 3 to about 7 microns. In an embodiment, the present invention is directed to a process comprised of homogenizing microsuspended particles of from about 0.05 micron to about 2 microns in volume diameter, containing a resin and pigment, in an aqueous solution containing surfactant, followed by aggregating the aforementioned pigmented particles by heating to generate toners with an average particle volume diameter of from about 3 to about 7 microns. In another embodiment thereof, the present invention is directed at a process comprised of dissolving a polymer resin, such as a polyester, polyacrylate or polymethacrylate of from about 5 to about 80 weight percent in an organic solvent such as methylene chloride or ethyl acetate; dispersing the resulting mixture in an aqueous solution containing surfactants such as sodium dodecylsulfate and polyoxyethylene nonyl phenyl ether, thereby obtaining suspended particles of from about 0.05 micron to about 2 microns in volume diameter; removing the organic solvent by stirring and optionally by heating from about 25° C. to about 60° C.; adding a pigment, such as HELIOGEN BLUE TM or HOSTAPERM PINK TM, of from about 1 to about 10 weight percent and homogenizing the mixture at about 500 to about 4,000 revolutions per minute; followed by aggregating the aforementioned pigment and suspended particles by heating to generate toners with an average particle diameter of from about 3 to about 7 microns. The aforementioned toners are especially useful for the development of colored images with excellent line and solid resolution, and wherein substantially no background deposits are present.

In color reprography, especially process color reprography wherein pictorial images are generated, high gloss of from about 50 gloss units to about 80 gloss units as measured by the Gardner Gloss meter is highly desirable. Additionally, toners which fix onto paper at low fusing temperatures, such as from about 125° C. to about 150° C., are desirable to prolong the lifetime of the fuser and reduce its energy consumption. Accordingly, in order to satisfy the aforementioned high gloss and low fusing temperature requirements, it is advantageous to utilize conventional toners comprised of polyesters as the resin binder. However, the process for obtaining conventional toners and toners in generally usually require the utilization of pulverization and cumbersome classification methods which are expensive, especially wherein small size toners of from about 3 microns to about 7 microns are desired. The process of this invention is directed to the economical preparation of toners containing, for example, polyester resins without the utilization of the known pulverization and attrition methods and wherein toners with an average volume diameter of from about 3 to about 7 microns can be obtained. Additionally, with the toners of this invention, high gloss of from about 50 to about 80 gloss units as measured by the Gardner gloss meter, and low fixing temperature of from about 125° C. to about 150° C. are attained in embodiments.

There is illustrated in U.S. Pat. No. 4,996,127 a toner of associated particles of secondary particles comprising primary particles of a polymer having acidic or basic polar groups and a coloring agent. The polymers selected for the toners of this '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. Additionally, this process involves the preparation of emulsion addition type resins, such as that obtained from styrene, ethyl acrylate and the like, and wherein it is believed that polyesters cannot be effectively obtained. Additionally, note column of '127 patent wherein the pigment is added with the emulsion particle. Also, note column 9, lines 50 to 55, wherein a polar monomer such as acrylic acid in the emulsion resin is necessary, and toner preparation is not obtained without the use, for example, of acrylic acid polar group, see Comparative Example I. The process of the present invention does not utilize polar acid groups, and toners can be prepared with polyester resins without containing polar acid groups. In U.S. Pat. No. 4,983,488, a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. This process is thus directed to emulsion type resins and monomers therefrom, and coagulants must be utilized. With the process of the present invention, addition type resins and polyester resins utilized for pictorial or process color applications with low fusing temperatures and high gloss can be obtained. Similarly, the aforementioned disadvantages are noted in other prior art, such as U.S. Pat. No. 4,797,339, wherein there is disclosed a process for the preparation of toners by resin emulsion polymerization and spray drying; and U.S. Pat. No. 4,558,108, wherein there is disclosed a process for the preparation of a copolymer of styrene and butadiene by specific suspension polymerization. More specifically, this patent discloses a microsuspension polymer process wherein a resin, preferably a polyester and solvent, is microsuspended to from about 0.05 to about 1 micron in volume diameter followed by aggregating to toner size particles of from about 3 microns to about 7 microns in volume diameter as measured by the Coulter Counter, and exhibit low fixing temperature of from about 125° to about 150° C., and high gloss of from about 50 to about 80 gloss units as measured by the Gardner Gloss device.

SUMMARY OF THE INVENTION

It is an object of the present invention to provide toner processes with many of the advantages illustrated herein.

In another object of the present invention there are provided simple and economical processes for the direct preparation of black and colored toner compositions.

In another object of the present invention there are provided simple and economical in situ processes for black and colored toner compositions by a microsuspension aggregation process.

In a further object of the present invention there is provided a process for the preparation of toners with an average particle diameter of from between about 3 to about 50 microns, and preferably from about 3 to about 21 microns.

These and other objects of the present invention are accomplished in embodiments by the provision of toners and processes thereof. In one embodiment of the present invention there are provided processes for the economical direct preparation of toners by an emulsion, suspension, aggregation process.

In embodiments the present invention is directed to processes for the preparation of polymers and toners which comprises initially attaining microsuspension size, for example from between about 0.05 to about 1 micron as determined by a Brookehaven Nanosizer of polymer followed by the aggregation with pigments to provide toner particles with an average particle diameter of a preselected desired size, for example from between about 1 to about 15 microns in average volume particle diameter, as inferred from Coulter Counter measurements. One process embodiment of the present invention for obtaining in situ toners comprises dissolving a polymer, like a polyester, in an organic solvent; dispersing the resulting solution in an aqueous media containing a surfactant, or mixture of surfactants; stirring the mixture resulting with optional heating to, for example, remove the organic solvent and enable microsuspended particles comprised of a polyester such as that derived from propoxylated bisphenol A and fumaric acid by melt-esterification (commercially available from Dow Chemical as SPAR II TM); subsequently adding to the resulting emulsion suspension a dispersion of pigment in water containing an ionic surfactant; and aggregating the polymer and pigment by heating thereby providing toner particles with an average particle volume diameter of from between about 1 to about 100 microns, and preferably from between about 3 to about 11 microns. Another process embodiment of the present invention for obtaining in situ toners comprises dissolving a polymer, like a polyester, and a pigment such as HOSTAPERM PINK TM, in an organic solvent; dispersing the resulting solution in an aqueous media containing a surfactant, or mixture of surfactants; stirring the mixture resulting with optional heating to, for example, remove the organic solvent and enabling microsuspended particles comprised of a polyester such as that derived from propoxylated bisphenol A and fumaric acid by melt-esterification; subsequently adding to the resulting microsuspension an ionic surfactant; and aggregating the polymer and pigment by heating thereby providing toner particles with an average particle volume diameter of from between about 1 to about 100 microns, and preferably from between about 3 to about 11 microns.

In embodiments, the process of the present invention comprises (a) dissolving a polyester such as poly(propoxylated bisphenol A—fumarate) available from Dow Chemicals as SPAR II TM and an organic solvent such as methylene chloride to provide a 30 percent by weight solution of polyester resin in the organic solvent; (b) dispersing the solvent mixture in an aqueous solution containing from about 1.0 to about 1.5 percent by weight of sodium dodecylsulfate, and from about 1 to about 1.5 percent by weight of polyethyleneoxide-nonyl phenyl ether (available from Rhone-Poulenac as ANTARAX 897 TM), utilizing a high shearing device such as a Brinkmann homogenizer at about 10,000 revolutions per minute and for a duration of from about 240 seconds to about 720 seconds, resulting in a mixture of from about 20 to about 25 percent by weight of microsuspended polyester particles of from about 0.05 micron to about 0.1 micron in diameter as measured by the Brookehaven Nanosizer, in the aqueous mixture; followed by (c) adding to the microsuspension a mixture containing a pigment, such as HOSTAPERM PINK TM, of from about 5 to about 7 percent by weight of the toner product, dispersed in an aqueous solution containing from about 0.5 to about 0.75 percent of an ionic surfactant such as MIRAPOL TM (available from Polyscience), and subsequently heating the mixture to about 80° C. for a duration of from about 360 minutes to about 720 minutes; (d) cooling the mixture to ambient temperature, washing, and drying the toner product by known methods such as fluid bed dryer.

In embodiments, the processes of the present invention are directed to the preparation of toner compositions which comprises dissolving a polymer, and optionally a pigment in an organic solvent; dispersing the resulting solution in an aqueous media containing a surfactant, or mixture of surfactants; stirring the mixture with optional heating to remove the organic solvent thereby obtaining suspended particles of about 0.05 micron to about 2 microns in volume diameter; subsequently homogenizing the resulting suspension with an optional pigment in water and surfactant; followed by aggregating the mixture by heating thereby providing toner particles with an average particle volume diameter of from between about 3 to about 21 microns when said pigment is present.

Illustrative examples of polymer resins selected for the process of the present invention include polyesters such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR TM (Dixie Chemicals), BECKOSOL TM (Reichhold Chemical Inc), ARAKOTE TM (Ciba-Geigy Corporation), HETRON TM (Ashland Chemical), PARAPLEX TM (Rohm & Hass), POLYLITE TM (Reichhold Chemical Inc), PLASTHALL TM (Rohm & Hass), CYGAL TM (American Cyanamide), ARMCO TM (Armco Composites), ARPOL TM (Ashland Chemical), CELANEX TM (Celanese Eng), RYNITE TM (DuPont), STYPOL TM (Freeman Chemical Corporation) mixtures thereof and the like, polycarbonates such as LEXAN TM (G. E. Plastics), BAYLON TM (Bayer), MAKROLON TM (Mobay), MERLON TM (Mobay), PANLITE TM (Teijin Chemical), mixtures thereof and like, polyurethanes such as PELLETHANE TM (Dow), ESTANE TM (Goodyear), CYTOR TM (American Cyanamide), TEXIN TM (Mobay), VIBRATHANE TM (Uniroyal Chemical), CONATHANE TM (Conap Company), polystyrene, polyacrylate, polymethacrylate, polystyrene-butadiene, polystyrene-methacrylate, polystyrene-acrylate, mixtures thereof and the like.

Various known colorants present in the toner in an effective amount of, for example, from about 1 to about 25 percent by weight of the toner, and preferably in an amount of from about 1 to about 15 weight percent, that can be selected include carbon black, like REGAL 330®; magnetites, such as Mobay magnetites MO8029 TM, MO8060 TM; Columbian magnetites; MAPICO BLACKS TM and surface treated magnetites; Pfizer magnetites, CB4799 TM, CB5300 TM, CB5600 TM, MCX6369 TM; Bayer magnetites, BAYFERROX 8600 TM, 8610 TM; Northern Pigments magnetites, NP-604 TM, NP-608 TM; Magnox magetites TMB-100 TM, or TMB-104 TM; and other equivalent black pigments. As colored pigments there can be selected known cyan, magenta, yellow, red, green, brown, blue or mixtures thereof. Specific examples of pigments include HELIOGEN BLUE L6900 TM, D6840 TM, D7080 TM, D7020 TM, PYLAM OIL BLUE TM, PYLAM OIL YELLOW TM, PIGMENT BLUE 1 TM available from Paul Uhlich & Company, Inc., PIGMENT VIOLET 1 TM, PIGMENT RED 48 TM, LEMON CHROME YELLOW DCC 1026 TM, E. D. TOLUIDINE RED TM and BON RED C TM available from Dominoion Color Corporation, Ltd., Toronto, Ontario, NOVAperm YELLOW FGL TM, HOSTAPERM PINK E TM from Hoechst, and CINQUASIA MAGENTA TM available from E. I. Du-Pont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK TM, and cyan components may also be selected as pigments with the process of the present invention. The pigments selected are present in various effective amounts, such as from about 1 weight percent to about 65 weight percent of the toner.

The toner may also include known charge additives such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, and the like.

Organic solvents which can be utilized to dissolve the resin are known and include methylene chloride, ethyl acetate, alcohols like methanol, ethanol, isopropanol, diisopropyl, butanol, ether, dimethyl ether, diethyl ether, butyl ether, ethyl chloride, propyl chloride, hexanes, pentanes, octanes, mixture thereof and the like. The solvent is utilized in various effective amounts that will enable dissolution, for example from about 20 weight percent to about 100 weight percent depending, for example, on the solvent selected.

Surfactants in effective amounts of, for example, 0.1 to about 25 weight percent in embodiments include, for example, nonionic surfactants such as polyvinyl alcohol, polyacrylic acid, methalose, methyl cellulose, cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octyphenyl ether, polyoxyethylene oleyl ether, polyoxyethylene sorbitan monolaurate, polyoxyethylene stearyl ether, polyoxyethylene nonylphenyl ether (available from GAF as IGEPAL CA-210 TM, IGEPAL CA-520 TM, IGEPAL CA-720 TM, IGEPAL CO-890 TM, IGEPAL CO-720 TM, IGEPAL CO-290 TM, IGEPAL CA-210 TM, ANTARAX 890 TM and ANTARAX 897 TM available from Rhone-Poulenac, dialkylphenoxy poly(ethyleneoxy)ethanol, ionic surfactants such as sodium dodecyl sulfate, sodium dodecyl-benzene sulfate, sodium dodecylnaphthalene sulfate, dialkyl benzenealkyl ammonium chloride, MIRAPOL TM, SANIZOL TM, mixtures thereof and the like. The surfactant is utilized in various effective amounts, such as for example from about 0.1 percent to about 5 percent by weight of water.

Surface additives that can be added to the toner compositions of the present invention include, for example, metal salts, metal salts of fatty acids, colloidal silicas, mixtures thereof and the like, which additives are usually present in an amount of from about 0.1 to about 1 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972 ® available from Degussa.

Percentage amounts of components are based on the total toner components unless otherwise indicated.

The following Examples are being submitted to further define various species of the present invention. These Examples are intended to be illustrative only and are not intended to limit the scope of the present invention. Also, parts and percentages are by weight unless otherwise indicated.

EXAMPLE I

A 7.5 micron toner comprised of a polyester derived from polypropoxylated-bisphenol A-fumaric acid (SPAR II TM), and HOSTAPERM PINK E TM pigment was prepared as follows.

One hundred (100) grams of polyester derived from bisphenol A-fumaric acid (obtained from Dow Chemical as SPAR II TM), was dissolved in methylene chloride (250 grams), and dispersed in a 2 liter kettle containing 700 grams of an aqueous solution containing one percent by weight of polyoxyethylene nonylphenyl ether (available from Rhone Poulenac as ANTARAX 897 TM), and one percent by weight of sodium dodecylsulfate, utilizing a Brinkmann homogenizer operating at 10,000 revolution per minute for a duration of 720 seconds. The resultant mixture was then stirred for a duration of 18 hours, after which the organic solvent was removed resulting in a mixture of microsuspended polyester particles with average volume particle size of about 150 nanometers as measured using the Brookehaven nanosizer. In a separate 200 milliliter vessel was dispersed HOSTAPERM PINK E TM (Hoechst Celanese) in 100 grams of an aqueous solution containing one percent of MIRAPOL TM (available from Miranol Inc.) utilizing a Brinkmann homogenizer operating at 10,000 revolutions per minute for a duration of 720 seconds. The dispersed pigment solution was then added to the 2 liter kettle containing the microsuspended polyester particles resulting in a flocculation of polyester particles and pigment. This mixture was then dispersed utilizing a Brinkmann homogenizer operating at 10,000 revolutions per minute for a duration of 3 minutes, and subsequently heated to 80° C. for a duration of 5 hours. The mixture was then cooled to ambient temperature, about 25° C., filtered off and washed repeatedly with water. The wet toner cake was then fluidized in an Aeromatic AG bed dryer operated at 50° C. for a duration of 3 hours. The dry toner particles had a volume average particle size of 7.5 microns in diameter as determined by a Coulter Counter.

EXAMPLE II

A 5.1 micron toner comprised of a polyester derived from bisphenol A-fumaric acid (SPAR II TM), and HOSTAPERM PINK E TM pigment was prepared as follows.

One hundred (100) grams of polyester derived from bisphenol A-fumaric acid (obtained from Dow Chemical as SPAR II TM) was dissolved in methylene chloride (250 grams), and dispersed in a 2 liter kettle containing 700 grams of an aqueous solution containing 1.25 percent by weight of polyoxyethylene nonylphenyl ether (available from Rhone Poulenac as ANTARAX 897 TM), and one percent by weight of sodium dodecylsulfate, utilizing a Brinkmann homogenizer operating at 10,000 revolutions per minute for a duration of 720 seconds. The resultant mixture was then stirred for a duration of 18 hours, after which the organic solvent was removed resulting in a mixture of microsuspended polyester particles with an average volume particle size of about 175 nanometers as measured using the Brookehaven nanosizer. In a separate 200 milliliter vessel was dispersed 7 grams of HOSTAPERM PINK E TM (Hoechst Celanese) in 100 grams of an aqueous solution containing 1.25 percent of MIRAPOL TM (available from Miranol Inc.) utilizing a Brinkmann homogenizer operating at 10,000 revolutions per minute for a duration of 720 seconds. The dispersed pigment solution was then added to the 2 liter kettle containing the microsuspended polyester particles resulting in a flocculation of polyester particles and pigment. This mixture was then dispersed utilizing a Brinkmann homogenizer operating at 10,000 revolutions per minute for a duration of 3 minutes, and subsequently heated to 75° C. for a duration of 5 hours. The mixture was then cooled to ambient temperature, filtered off and washed repeatedly with water. The wet toner cake was then fluidized in an Aeromatic AG bed dryer operated at 50° C. for a duration of 3 hours. The dry toner particles had a volume average particle size of 5.1 microns in diameter as determined by a Coulter Counter.

EXAMPLE III

An 11 micron toner comprised of a polyester derived from bisphenol A-fumaric acid (SPAR II TM), and HOSTAPERM PINK E TM pigment was prepared as follows.

One hundred (100) grams of polyester derived from Bisphenol A-Fumaric acid (obtained from Dow Chemicals as SPAR II TM), methylene chloride (250 grams), and HOSTAPERM PINK E TM (Hoechst Celanese) (7 grams) was ball milled for a duration of 16 hours. The mixture was then dispersed in a 2 liter kettle containing 700 grams of an aqueous solution containing 1.0 percent by weight of polyoxyethylene nonylphenyl ether (available from Rhone Poulenac as ANTARAX 897 TM), and one percent by weight of sodium dodecylsulfate utilizing a Brinkmann homogenizer operating at 10,000 revolutions per minute for a duration of 720 seconds. The resultant mixture was then stirred for a duration of 18 hours, after which the organic solvent was removed resulting in a mixture of microsuspended pigmented polyester particles and displayed an average volume particle size of about 225 nanometers as measured using the Brookehaven nanosizer. To this mixture was then added an aqueous solution of MIRAPOL TM resulting in a flocculation of pigmented polyester particles. This mixture was then dispersed utilizing a Brinkmann homogenizer operating at 10,000 revolutions per minute for a duration of 3 minutes, and subsequently heated to 90° C. for a duration of 5 hours. The mixture was then cooled to ambient temperature, filtered off and washed repeatedly with water. The wet toner cake was then fluidized in an Aeromatic AG bed dryer operated at 50°

C. an for a duration of 3 hours. The dry toner particles displayed a volume average particle size of 11 microns in diameter as determined by a Coulter Counter.

EXAMPLE IV

A 7 micron toner comprised of a polyester derived from bisphenol A-fumaric acid (SPAR II TM), and HOSTAPERM PINK E TM pigment was prepared as follows.

One hundred (100) grams of polyester derived from bisphenol A-fumaric acid (obtained from Dow Chemical as SPAR II TM), methylene chloride (250 grams), and 7 grams of HOSTAPERM PINK TM (Hoechst Celanese) was ball milled for a duration of 16 hours. The mixture was then dispersed in a 2 liter kettle containing 700 grams of an aqueous solution containing 1.5 percent by weight of polyoxyethylene nonylphenyl ether (available from Rhone Poulenac as ANTARAX 897 TM), and one percent by weight of sodium dodecylsulfate, utilizing a Brinkmann homogenizer operating at 10,000 revolutions per minute for a duration of 720 seconds. The resultant mixture was then stirred for a duration of 18 hours, after which the organic solvent was removed resulting in a mixture of microsuspended pigmented polyester particles and displayed an average volume particle size of about 225 nanometers as measured using the Brookehaven nanosizer. To this mixture was then added an aqueous solution of MIRAPOL TM resulting in a flocculation of pigmented polyester particles. This mixture was then dispersed utilizing a Brinkmann homogenizer operating at 10,000 revolutions per minute for a duration of 3 minutes, and subsequently heated to 75° C. for a duration of 5 hours. The mixture was then cooled to ambient temperature, filtered off and washed repeatedly with water. The wet toner cake was then fluidized in an Aeromatic AG bed dryer operated at 50° C. for a duration of 3 hours. The dry toner particles displayed a volume average particle size of 7 microns in diameter as determined by a Coulter Counter.

EXAMPLE V

A 13 micron toner comprised of a polyester derived from bisphenol A-fumaric acid (SPAR II TM), and HELIOGEN BLUE TM pigment was prepared as follows.

One hundred (100) grams of polyester derived from bisphenol A-fumaric acid (obtained from Dow Chemical as SPAR II TM), methylene chloride (250 grams), and 7 grams of HELIOGEN BLUE TM (available from BASF) was ball milled for a duration of 16 hours. The mixture was then dispersed in a 2 liter kettle containing 700 grams of an aqueous solution containing 1.0 percent by weight of polyoxyethylene nonylphenyl ether (available from Rhone Poulenac as ANTARAX 897 TM), and one percent by weight of sodium dodecylsulfate utilizing a Brinkmann homogenizer operating at 10,000 revolutions per minute for a duration of 720 seconds. The resultant mixture was then stirred for a duration of 18 hours, after which the organic solvent was removed resulting in a mixture of microsuspended pigmented polyester particles and displayed an average volume particle size of about 260 nanometers as measured using the Brookehaven nanosizer. To this mixture was then added an aqueous solution of MIRAPOL TM resulting in a flocculation of pigmented polyester particles. This mixture was then dispersed utilizing a Brinkmann homogenizer operating at 10,000 revolutions per minute for a duration of 3 minutes, and subsequently heated to 90° C. for a duration of 5 hours. The mixture was then cooled to ambient temperature, filtered off and washed repeatedly with water. The wet toner cake was then fluidized in an Aeromatic AG bed dryer operated at 50° C. for a duration of 3 hours. The dry toner particles displayed a volume average particle size of 13 microns in diameter as determined by a Coulter Counter.

In embodiments, the present invention is directed to (1) a process for the preparation of toner compositions, which comprises dissolving a polymer and a pigment in an organic solvent; dispersing the resulting solution in an aqueous media containing surfactant; stirring the mixture with heating to remove the organic solvent thereby obtaining suspended particles of about 0.05 micron to about 2 microns in volume diameter; subsequently homogenizing the resulting suspension with pigment in water and surfactant; followed by aggregating the mixture by heating thereby providing toner particles with an average particle volume diameter of from between about 3 to about 21 microns; (2) a process for the preparation of polymers and toner compositions which comprises dissolving a polymer in an organic solvent; dispersing the resulting solution in an aqueous media containing a surfactant, or mixture of surfactants; stirring the mixture to remove the organic solvent thereby obtaining suspended particles of about 0.05 micron to about 2 microns in volume diameter; subsequently homogenizing the resulting suspension with a pigment in water and surfactant; followed by aggregating the suspension by heating thereby providing toner particles with an average particle volume diameter of from between about 3 to about 21 microns; and (3) a process for the preparation of toner compositions which comprises dissolving a polymer and a pigment in an organic solvent; dispersing the resulting solution in an aqueous media containing surfactant; stirring the mixture with heating to remove the organic solvent and obtaining suspended particles of about 0.05 micron to about 3 microns in volume diameter; subsequently homogenizing the resulting suspension with a surfactant; followed by aggregating the suspension by heating thereby providing toner particles with an average particle volume diameter of from between about 3 to about 21 microns.

Other modifications of the present invention may occur to these skilled in the art subsequent to a review of the present application, and these modifications, including equivalents thereof, are intended to be included within the scope of the present invention.

What is claimed is:

1. A process for the preparation of toner compositions consisting essentially of dissolving a polymer, and a pigment in an organic solvent; dispersing the resulting solution in an aqueous media containing a surfactant, or mixture of surfactants; stirring the mixture with optional heating to remove the organic solvent thereby obtaining suspended particles of about 0.05 micron to about 2 microns in volume diameter; subsequently homogenizing the resulting suspension with pigment in water and surfactant; followed by aggregating the resulting suspension by heating thereby providing toner particles with an average particle volume diameter of from between about 3 to about 21 microns.

2. A process in accordance with claim 1 wherein the polymer is a styrene acrylate, a styrene methacrylate, a styrene butadiene, or a polyester.

3. A process in accordance with claim 1 wherein the pigment is carbon black, magnetite, or mixtures thereof.

4. A process in accordance with claim 1 wherein the pigment is cyan, magenta, yellow, or mixtures thereof.

5. A process in accordance with claim 1 wherein the organic solvent is an alkylene halide, an ether or an alkyl acetate.

6. A process in accordance with claim 1 wherein the organic solvent is methylene chloride, diethyl ether or ethyl acetate.

7. A process in accordance with claim 6 wherein the surfactant is present in an amount of from about 0.01 to about 3 weight percent.

8. A process in accordance with claim 1 wherein the surfactant is polyethylene oxide, polyacrylic acid, polypropylene oxide, polybutylene oxide, poly(oxyethylene-nonyl phenyl) ether, methyl cellulose, ethyl cellulose, sodium dodecylsulfate, sodium dodecylbenzenesulfonate, dialkylbenzene alkylammonium chloride, or mixtures thereof.

9. A process in accordance with claim 1 wherein the dispersion temperature is from about 20° C. to about 80° C.

10. A process in accordance with claim 1 wherein the temperature employed for heating to remove the organic solvent is from about 20° C. to about 80° C.

11. A process in accordance with claim 10 wherein the homogenization is for a duration of from about 2 minutes to about 720 minutes.

12. A process in accordance with claim 1 wherein the aggregation temperature is from about 30° C. to about 95° C.

13. A process in accordance with claim 1 wherein the homogenization is from about 500 revolutions per minute to about 4,000 revolutions per minute.

14. A process in accordance with claim 1 wherein there is added to the toner product surface additives of metal salts, metal salt of fatty acids, silicas, or mixtures thereof.

15. A process in accordance with claim 1 wherein the amount of the polymer dissolved in the organic solvent is from about 5 to about 95 weight percent.

16. A process for the preparation of toner compositions consisting essentially of dissolving a polymer, in an organic solvent; dispersing the resulting solution in an aqueous media containing nonionic surfactant; stirring the mixture with heating to remove the organic solvent thereby obtaining suspended particles of about 0.05 micron to about 2 microns in volume diameter; subsequently homogenizing the resulting suspension with a pigment in water and nonionic surfactant; followed by aggregating the suspension by heating thereby providing toner particles with an average particle volume diameter of from between about 3 to about 21 microns.

17. A process in accordance with claim 16 wherein the pigment is carbon black, magnetite, or mixtures thereof; or cyan, magenta, yellow, or mixtures thereof; and the surfactant is polyethylene oxide, polyacrylic acid, polypropylene oxide, polybutylene oxide, poly(oxyethylene-nonyl phenyl) ether, methyl cellulose, or ethyl cellulose, sodium dodecylsulfate, chloride, dialkylbenzene alkylammonium chloride, or mixtures thereof.

18. A process for the preparation of toner compositions which comprises dissolving a polymer and a pigment in an organic solvent; dispersing the resulting solution in an aqueous media containing nonionic surfactant; stirring the mixture with heating to remove the organic solvent and obtaining suspended particles of about 0.05 micron to about 2 microns in volume diameter; subsequently homogenizing the resulting suspension with a nonionic surfactant; followed by aggregating the suspension by heating thereby providing toner particles with an average particle volume diameter of from between about 3 to about 21 microns.

19. A process in accordance with claim 18 wherein the pigment is carbon black, magnetite, or mixtures thereof; or cyan, magenta, yellow, or mixtures thereof; and the surfactant is polyethylene oxide, polyacrylic acid, polypropylene oxide, polybutylene oxide, poly(oxyethylene-nonyl phenyl), ether, methyl cellulose, or ethyl cellulose, sodium dodecylsulfate, chloride, dialkylbenzene alkylammonium chloride, or mixture thereof.

* * * * *